(12) United States Patent
Seddon et al.

(10) Patent No.: US 7,498,978 B2
(45) Date of Patent: Mar. 3, 2009

(54) RADIO FREQUENCY AND MICROWAVE SIGNALS

(75) Inventors: Nigel Seddon, Filton (GB); John E Dolan, Filton (GB)

(73) Assignee: BAE Systems plc, London (GB)

(*) Notice: Subject to any disclaimer, the term of this patent is extended or adjusted under 35 U.S.C. 154(b) by 0 days.

(21) Appl. No.: 10/469,963

(22) Filed: Oct. 30, 2003

(65) Prior Publication Data

US 2007/0152875 A1 Jul. 5, 2007

(30) Foreign Application Priority Data

Nov. 13, 2002 (GB) ................. 0226394.5

(51) Int. Cl.
*G01S 7/282* (2006.01)
*H03B 19/00* (2006.01)
*G01S 13/00* (2006.01)

(52) U.S. Cl. .................. 342/202; 342/82; 342/175; 332/106; 333/218

(58) Field of Classification Search ............ 342/175, 342/202, 203, 204, 82, 83; 375/130–153; 324/307, 300–322; 307/106, 108, 2, 110; 331/3, 77, 81, 96, 94.1, 107 DP; 333/20, 333/21 R, 24.1, 212, 1.1, 218, 24 R; 327/91, 327/170, 189, 321, 172; 372/25, 69, 38.02, 372/38.04, 38.08; 332/106–116
See application file for complete search history.

(56) References Cited

U.S. PATENT DOCUMENTS

| | | | | | |
|---|---|---|---|---|---|
| 2,837,649 | A | * | 6/1958 | Hershberger | ............. 331/3 |
| 2,871,453 | A | * | 1/1959 | Bradley | ............. 333/20 |
| 2,873,370 | A | * | 2/1959 | Pound | ............. 324/307 |
| 2,961,617 | A | * | 11/1960 | Stern | ............. 331/77 |
| 2,962,676 | A | * | 11/1960 | Marie | ............. 333/24.1 |
| 2,981,903 | A | * | 4/1961 | Uitert | ............. 333/24.1 |
| 3,054,042 | A | * | 9/1962 | Weiss | ............. 333/24.1 |
| 3,090,930 | A | * | 5/1963 | Dunn | ............. 333/24.1 |
| 3,214,683 | A | * | 10/1965 | Andres | ............. 324/304 |
| 3,229,193 | A | * | 1/1966 | Schaug-Pettersen et al. | ..... 333/24.1 |
| 3,544,880 | A | * | 12/1970 | Kaufman | ............. 333/218 |
| 3,878,449 | A | * | 4/1975 | Wilhelmi et al. | ............. 307/108 |

(Continued)

FOREIGN PATENT DOCUMENTS

GB         833130         4/1960

(Continued)

OTHER PUBLICATIONS

C. Brooker et al., "90 kV 1800 A 85 ps rise time electromagnetic shock line for UWB applications"; Electronics Letters; vol. 35, No. 25; Dec. 9, 1999; pp. 2210-2212.*

(Continued)

*Primary Examiner*—Bernarr E Gregory
(74) *Attorney, Agent, or Firm*—Nixon & Vanderhye P.C.

(57) ABSTRACT

A device for generating high powered Radio Frequency (RF) or microwave signals comprising a fast rise-time video pulse generator, a modulator to modify the generated UWB pulses by gyromagnetic action to transfer a portion of the UWB pulse energy from lower frequencies to frequencies in the RF or microwave range thereby producing a resultant RF or microwave waveform that can be radiated.

8 Claims, 2 Drawing Sheets

U.S. PATENT DOCUMENTS

| | | | | |
|---|---|---|---|---|
| 3,879,677 | A | * | 4/1975 | Arnold ................. 331/77 |
| 3,983,416 | A | * | 9/1976 | Cronson .............. 333/20 |
| 4,034,313 | A | * | 7/1977 | Jones et al. ........... 331/96 |
| 4,225,866 | A | | 9/1980 | Levine |
| 4,630,002 | A | * | 12/1986 | Leiba .................. 331/96 |
| 4,855,696 | A | * | 8/1989 | Tan et al. ............. 333/20 |
| 4,956,568 | A | * | 9/1990 | Su et al. .............. 333/20 |
| 5,014,018 | A | * | 5/1991 | Rodwell et al. ....... 333/20 |
| 5,023,574 | A | * | 6/1991 | Anklam et al. ........ 333/20 |
| 5,066,928 | A | * | 11/1991 | Ikezi et al. ............ 333/20 |
| 5,216,695 | A | | 6/1993 | Ross et al. |
| 5,319,665 | A | * | 6/1994 | Birx .................... 333/20 |
| 5,729,562 | A | * | 3/1998 | Birx et al. ............. 372/38.04 |
| 5,804,921 | A | * | 9/1998 | McEwan et al. ....... 333/20 |
| 5,914,974 | A | * | 6/1999 | Partlo et al. ........... 372/38.08 |
| 5,936,988 | A | * | 8/1999 | Partlo et al. ........... 372/38.04 |
| 6,151,346 | A | * | 11/2000 | Partlo et al. ........... 372/38.02 |
| 6,690,247 | B2 | * | 2/2004 | Kintis et al. .......... 333/20 |
| 6,690,741 | B1 | * | 2/2004 | Larrick, Jr. et al. .... 375/130 |
| 6,826,208 | B1 | * | 11/2004 | Birk .................... 372/25 |

FOREIGN PATENT DOCUMENTS

| | | | |
|---|---|---|---|
| GB | 1358058 A1 | * | 6/1974 |
| GB | 0 320 175 | | 6/1989 |
| GB | 2 262 849 | | 6/1993 |

OTHER PUBLICATIONS

C. Brooker et al, "90 kV 1800 A 85 ps Rise Time Electromagnetic Shock Line for UWB Applications" *Electronics Letters*, vol. 35, No. 25, Dec. 1999.

J.E. Dolan et al, "Design of High prf Ferrite-Loaded Pulse Sharpening Devices" Extended Colloquium Abstract for IEE Pulsed Power '97, 1997.

* cited by examiner

RADIO FREQUENCY AND MICROWAVE SIGNALS

BACKGROUND OF THE INVENTION

1. Field of the Invention

This invention relates to Radio Frequency (RF) and microwave signals and in particular the generation of high power microwave signals for use in high resolution radar and Directed Energy applications. Because microwave signals fall within the range of RF frequencies, all subsequent references to "RF or microwave signals" and "RF and/or microwave signals" are intended to mean a reference to Radio Frequency signals.

2. Discussion of Prior Art

Shaw H. J., Elliott, B. J., Harker K. J., and Karp A., Microwave generation in pulsed ferrites, J. App. Phys., Vol 37, No. 3, 1966 details a method for converting energy from a pulsed magnetic field to a microwave signal in a waveguide. Shaw's 'Pulsed Magnetic Microwave Generator' relies on impulse-driven gyromagnetic precession in a small Yttrium Iron Garnet (YIG) sphere to convert energy from a 'pump pulse' to a microwave signal. A small spherical (approximately 1 mm diameter) specimen of magnetic material is placed in a microwave waveguide cavity. A strong, constant magnetic bias field is applied to the magnetic sphere in order to align magnetic moments within the magnetic material. Subsequently a strong pulsed magnetic field is applied to the sphere at some angle to the constant bias field. The pulsed magnetic field causes realignment of the magnetisation vector in the sphere on a timescale that is similar to the rise time of the pulsed field. If the rise time is sufficiently short the magnetisation vector does not simply follow the pulsed field but precesses around the direction of the applied field. This gyromagnetic precession persists for a time that is related to damping processes in the magnetic material. The precessing magnetisation vector in the magnetic material constitutes an oscillator at the gyromagnetic precession frequency. The magnetic sphere is located in a waveguide cavity so that energy from the gyromagnetic oscillator is coupled into the waveguide as an electromagnetic signal. Consequently the magnetic sphere is used as an impulse-excited transducer that converts energy from the pulsed magnetic field to a microwave signal in the waveguide.

Disadvantages of this method of generation of microwave signals include; the amount of energy and power that can be converted to a microwave signal is limited by the requirement for a small spherical specimen of magnetic material, usually YIG, to achieve fully temporally and spatially coherent precession and, because the pulsed magnetic field is produced by passing a large pulsed current through an external coil, the ratio of microwave energy produced to the energy stored in the coil is inherently low, as the pulsed magnetic field is applied to a large volume compared to the volume of the sphere.

An object of the present invention is to provide an alternative method and apparatus for generating pulsed RF or microwave signals.

SUMMARY OF THE INVENTION

According to a first aspect of the present invention there is provided a RF or microwave signal generator comprising a video pulse generator and a transmission line modulator configured to modify the generated video pulses by impulse-excited gyromagnetic precession. This will transfer a portion of the video pulse energy from low frequencies to RF or microwave frequencies thereby producing a resultant waveform with a RF and/or microwave component.

In this context a video pulse is defined as an electrical pulse with short rise-time relative to the pulse width, and a substantially constant amplitude over the pulse duration. When a video pulse is fed into a suitable antenna an Ultra Wide Band (UWB) pulse may be radiated. UWB waveforms are of interest for high resolution radar and Directed Energy applications because their short pulse duration can provide a good target resolution, and the very broad spectral energy content has potential to be coupled with a wide range of features on a target.

However, the majority of the energy in a video pulse waveform is contained in spectral components below the 100 MHz region and so is not radiated in the UWB waveform.

It has been found that modulating the video pulse at a suitable frequency produces a modulated pulse having a significant energy content shift to the radio and/or microwave frequencies, representing a major increase in the energy that can be radiated by the antenna. Thus the modulation to the waveform allows the radiated signal to be focused to a greater degree and increases the radiated field that can be produced at a large distance from the source.

Preferably the modulator includes a non-linear transmission line containing magnetic material, further preferably having strong gyromagnetic characteristics. As the RF wave and/or microwave modulation is produced in a travelling wave manner, this largely removes the restriction on the magnetic material volume suffered by the prior art, allowing larger power levels to be generated.

Non-linear material can be used to form electromagnetic shock waves in transmission lines, for example, coaxial transmission lines as outlined by Katayev, I. G., 'Electromagnetic shock waves', Iliffe Books Ltd., 1966, and also Weiner M. and Silber L. 'Pulse sharpening effects in ferrites', IEEE Trans Magn 1981, MAG-17, pp 1472-1477. Transmission lines may contain saturable magnetic materials and be used to produce electrical impulses with short pulse rise times. These devices exploit magnetic non-linearity of the magnetic material to form an 'electromagnetic shock wave' that is a very rapid change in electric and magnetic fields within the transmission line. The rate of change of these fields is determined by the limiting dynamic response of the magnetic material to strong applied fields. In practical embodiments of these devices an electrical impulse is injected into a coaxial transmission line containing the magnetic material. As the electrical pulse propagates along the transmission line the leading edge of the input pulse is modified by the magnetic non-linearity, the rise-time pulse becoming progressively shorter until the limiting response time is achieved. Once the limiting response time is achieved the pulse continues to propagate with this rise-time. This type of electromagnetic shock line can be used to form video pulses with sub-nanosecond rise-times.

The transmission line embodiment of this invention allows a high power video pulse source to be modified to give the waveform and frequency characteristics of a pulsed RF or microwave source.

The electrical and magnetic characteristics of the non-linear transmission line, and the materials of construction, are selected to produce strong gyromagnetic precession of the magnetisation within the magnetic components when an electrical impulse is injected into the transmission line. The induced gyromagnetic precession influences the propagation characteristics of the injected electrical impulse and modulates the impulse at RF and/or microwave frequencies. The resultant waveform at the output of the non-linear transmission line is an impulse that is modulated with a RF and/or microwave component. The characteristics of the modulation are determined by the design of the non-linear transmission line and the selection of suitable magnetic materials that exhibit strong gyromagnetic behaviour.

The impulse generator may produce a pumping impulse. This design allows a physically and electrically extended interaction to be achieved between the pumping signal and the magnetic material. The advantages of this scheme are that a significantly larger volume of magnetic material can be excited by a travelling wave in a transmission line, and the energy in the pumping pulse is used more effectively. As a consequence the energy conversion efficiency of this device is considerably higher than that achieved by the prior art. The RF signal and/or microwave signal that is generated by gyromagnetic precession in the magnetic material is supported by the transmission line and appears as a modulation on the pumping video pulse; consequently a separate waveguide is not required to extract the RF and/or microwave signal.

The spectral profile of the resultant output pulse may be determined by tuning frequency output by adjusting the frequency at which the video pulses are modulated by varying the amplitude of the constant axial magnetic field $H_{ax}$, and/or the amplitude of the pumping impulse and/or the dimensions of the magnetic material and of the coaxial structure.

An external magnetic field may be applied to the transmission line. This magnetic field may have components axially or otherwise orientated to the transmission line. Preferably the transmission line comprises low dielectric loss insulators such as polytetrafluroethylene (PTFE) or polypropylene. The transmission line may have conductors made from copper, silver or gold or other high conductivity materials to minimise resistive dissipation.

According a second aspect of the invention there is provided an antenna having a microwave signal generator as previously described.

According to a third aspect of the invention there is provided a method for generating microwave signals including the steps of:

generating short rise-time video pulses; and modifying the video pulses' energy from frequencies below the RF or microwave range to frequencies in the RF or microwave range thereby producing a resultant waveform with an RF or microwave component.

BRIEF DESCRIPTION OF THE DRAWINGS

The invention will now be further described by way of example only and with reference to the accompanying drawings of which.

DETAILED DISCUSSION OF EMBODIMENTS

Figure 1:
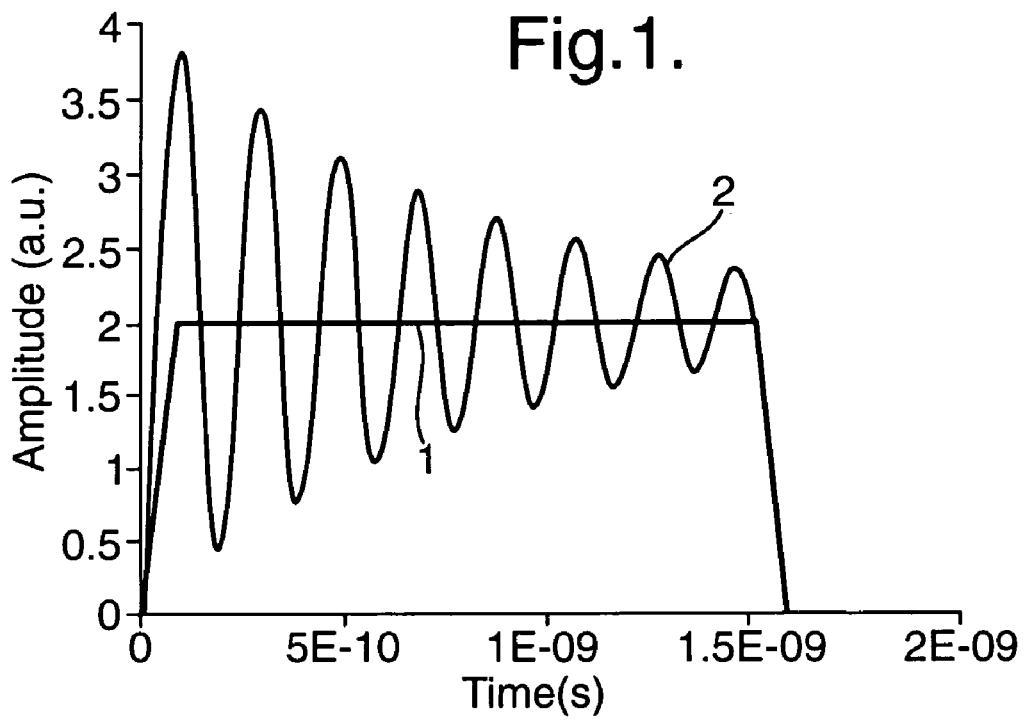
FIG. 1 shows a graphical comparison of the temporal waveforms of a video waveform and a suitably modulated video waveform to cause a significant energy content shift to the microwave frequencies.
Figure 2:
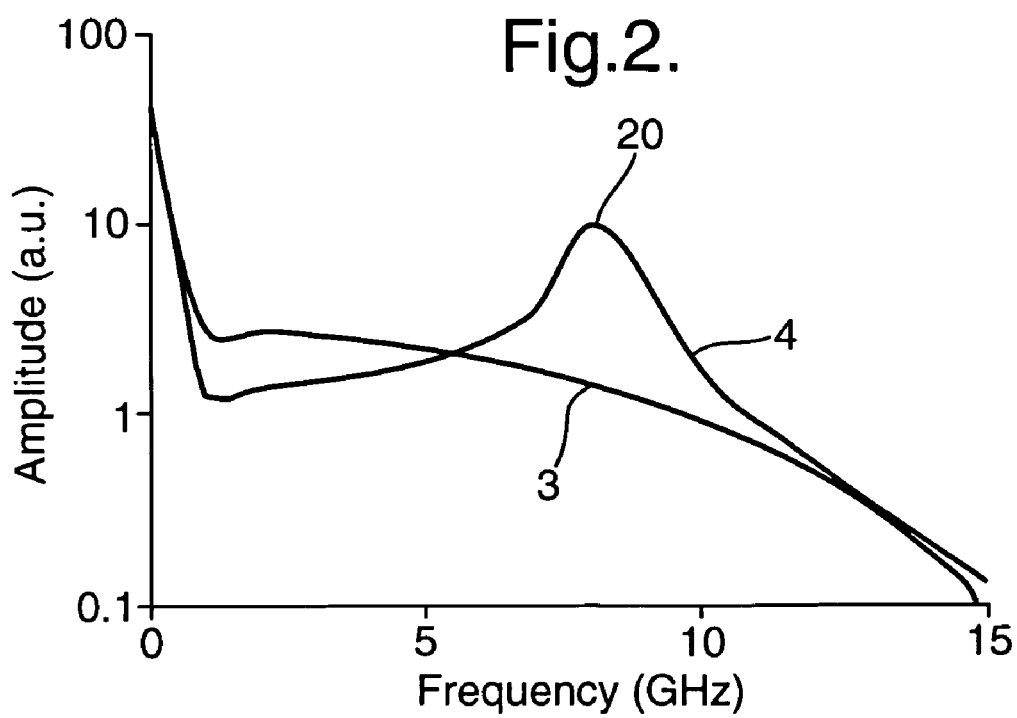
FIG. 2 shows the Fourier spectrums associated with the video waveform and modulated video waveform of FIG. 1.

FIG. 1 compares the time waveform of a typical electrical video impulse 1, with a 0.1 ns rise time and a 1.5 ns pulse duration and the time waveform of a microwave modulated pulse 2. The electrical video pulse might typically be used to drive a UWB antenna directly. FIG. 2 shows the Fourier spectrums of the unmodulated video pulse waveform 3, and microwave modulated waveform 4. From FIG. 2 it can be seen that the majority of energy in the video pulse 1 is contained in spectral components below the 100 MHz region and that there is very little energy in the higher frequency components. Thus a large portion of the components of the video pulse would not be radiated by an antenna because most of the components would have a frequency below the cut-off of the antenna.

However, the Fourier spectrum of the modulated waveform 4 shows a major peak 20 at the modulation frequency. This represents energy shifted from the video frequencies up to the microwave frequencies and a major increase in the energy which can be practically radiated by an antenna because a larger portion of the modulated pulses' components have frequencies above the cut-off of the antenna.

Figure 3:
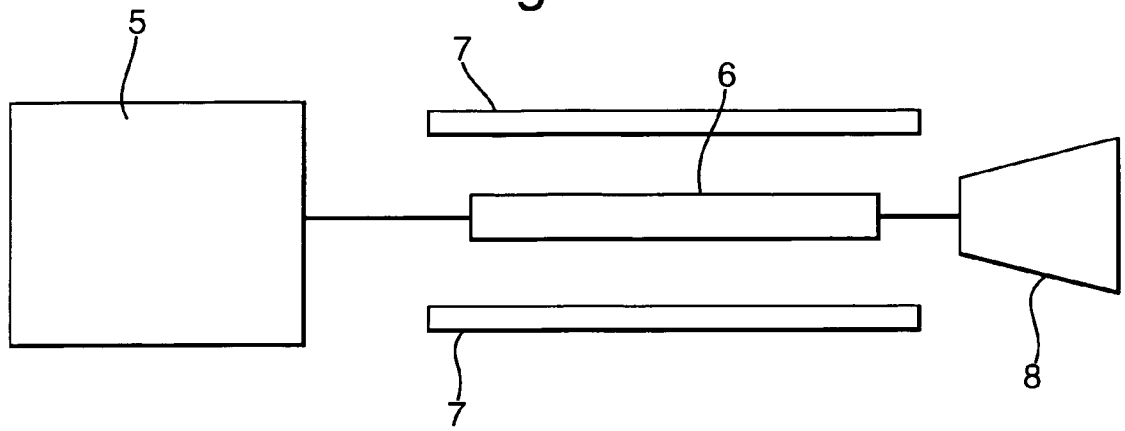
FIG. 3 shows a schematic diagram of an apparatus for generating microwave signals in accordance with the invention.

The apparatus in FIG. 3 includes a high power video pulse generator 5. The pulse generator 5 produces a pumping impulse. The pumping impulse is a high power video signal with duration typically 1 to 10 ns and a pulse rise time of approximately 0.1 ns. The voltage amplitude of this pumping impulse is dependent on the application and may be from less than 10 kV to several 100 kV. Such pulse generators are typically switched by hydrogen thyratrons or high power semiconductors and are produced by specialist companies including Kentech Ltd and FID Technologies GmbH. The pulse generator may also contain some form of electromagnetic shock line for pulse sharpening. The pumping impulse is injected into a non-linear transmission line 6 (for example a coaxial transmission line) which contains magnetic material 10 (see FIG. 4) that is selected to support strong gyromagnetic characteristics. A magnetising structure 7 is provided around the outside of the transmission line 6 in order to apply bias to the magnetic material 10. The output of the non-linear transmission line 6 is fed into a suitable load structure 8 such as an antenna.

Figure 4:
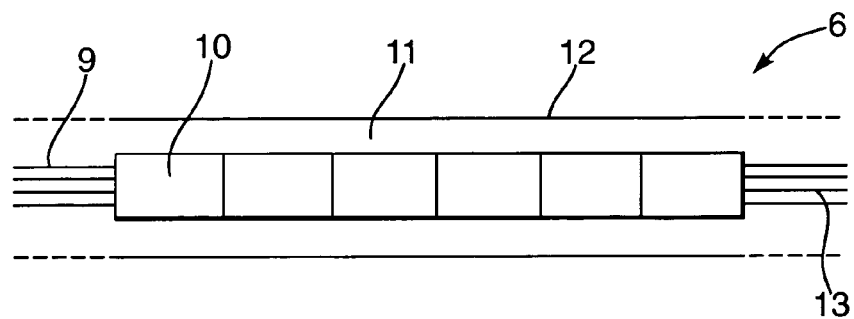
FIG. 4 shows in detail the geometric disposition of the coaxial transmission line structure and the magnetic material used in the apparatus of FIG. 3.

FIG. 4 shows the structure of the coaxial transmission line 6. In this embodiment magnetic toroids 9 are placed coaxially around a central conductor 13 of the transmission line 6. Magnetic material 10 surrounds the toroids 9. The toroids 9 are in turn surrounded by high voltage insulating dielectric 11 such as polytetrafluroethylene (PTFE) and this is enclosed by the return conductor 12 of the transmission line 6.

Figure 5:
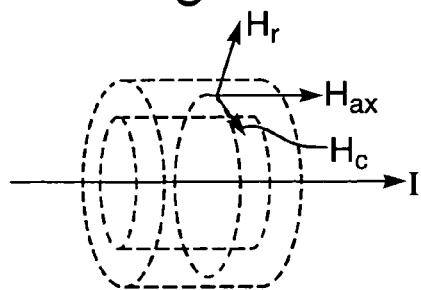
FIG. 5 is a schematic representation of the magnetic field applied to the non-linear transmission line of FIG. 4.

Referring to FIG. 5 a constant magnetic field $H_{ax}$ is generated by the magnetising structure 7 and this field is applied to the non-linear transmission line 6 in an axial or other orientation. The purpose of the constant magnetic field $H_{ax}$ is to align the magnetisation vector of the magnetic material 10 along a particular axis, typically the axial direction of the transmission line 6. The initial alignment of the magnetisations is a prerequisite for stimulation of gyromagnetic precession. The external source of magnetic field 7 may be a solenoid that is wound around the transmission line 6 or a suitably arranged collection of permanent magnets.

The pumping impulse produces a circumferential $I/2\pi r$ magnetic field $H_c$, where I is the pulse current and r is the mean radius of the magnetic material, in the transmission line 6, that rotates the magnetisation vector of the magnetic material 10 away from the initial direction toward the circumferential direction. The rate at which the magnetisation vector of the magnetic material 10 is rotated is dependent on the rise time of the pumping impulse, and the rise time of the pumping pulse should therefore be as short as possible. A sufficiently short rise time to the pumping impulse will cause the magnetisation vector in the magnetic material 10 to gyromagnetically precess about the direction of the net applied magnetic field at a rate defined by the expression:

$$\frac{dM}{dt} = \gamma\mu_0 M \times H + \frac{\alpha}{M_s} \cdot M \times \frac{dM}{dt} \text{ where;}$$

$$\frac{dM}{dt}$$

is the rate of change of Magnetisation in the Magnetic Material 10,

γ is the Gyromagnetic Ratio, $\mu_0$ is the Permeability of Free Space,

M is the Magnetisation of the Magnetic Material 10,

H is the Applied Magnetic Field,

α is the Damping Factor, $M_S$ is the Saturation Magnetisation of the Magnetic Material 10.

Precession of the magnetisation vector of the magnetic material 10 provides an oscillatory magnetic field component in the transmission line 6. This precessing field component in the magnetic material couples with the field of the pumping impulse to produce a modulation of the amplitude of the pumping impulse. The length of non-linear transmission line 6 required for the modulated signal to build up to its steady state amplitude is typically 5-50 cm. The duration of the microwave modulation that can be developed in practice is typically in the region of 1 to 5 ns for a single impulse.

The depth and duration of modulation of the pumping impulse are dependent on the gyromagnetic precession characteristics of the magnetic material 10 (usually ferrite or Yttrium Iron Garnet (YIG)), and also the dielectric and conductive loss mechanisms in the transmission line 6. The gyromagnetic precession is excited by the leading edge of the pumping impulse and persists for a time that is determined by damping and loss mechanisms both in the magnetic material 10 and in the transmission line structure 6. Lower loss rates give rise to higher modulation depths and longer decay periods. The primary contribution to decay of the precession is gyromagnetic damping in the magnetic material 10. In order to produce the longest microwave signal, it is therefore preferable to use materials with low gyromagnetic losses such as garnet-structured ferrite materials in single crystal or polycrystalline form. It is also preferable to reduce high frequency losses in the structure of the transmission line 6 by using low dielectric loss insulators 11 such as PTFE or polypropylene and also to minimise resistive dissipation in the transmission line 6 conductors by using high conductivity materials such as copper, silver or gold.

It is possible to tune the frequency output. The frequency of gyromagnetic precession is dependent on the properties of the magnetic material 10 that is used, on the amplitude of the constant axial magnetic field $H_{ax}$, on the amplitude of the pumping impulse and on the dimensions of the magnetic material and of the coaxial structure. The amplitude of the axial magnetic field $H_{ax}$ and/or the amplitude of the pumping impulse may therefore be used to adjust the frequency of the microwave modulation and hence to determine the spectral profile of the resultant output pulse.

The device may be applied in an ultra high repetition rate mode. The radiated power is determined by the product of pulse energy with pulse repetition rate. The radiated power can therefore be increased by increasing the pulse repetition rate. The maximum power and repetition rate are limited by thermal and cooling issues. The recovery time after a single forward pulse is of the order of 5 ns. This means that it is feasible to drive the transmission line in burst mode at extremely high pulse repetition rates at up to the order of 100-200 MHz or higher. Techniques for generating such pulse bursts may involve specialised semiconductor switching or the use of pulse forming network (PFN's).

A rapid succession of video pulses of either the same or alternating polarity can therefor be used to produce a rapid succession of microwave signals i.e. creating a train of quasi-continuous microwave bursts.

The invention claimed is:

1. A Radio Frequency (RF) signal generator comprising:
   a video pulse generator; and
   a transmission line modulator configured to modify the generated video pulses by impulse-excited gyromagnetic action to transfer a portion of the video pulses' energy from frequencies below the RF range to a frequency output having frequencies in the RF range thereby producing a resultant corresponding RF waveform, wherein the transmission line modulator includes a non-linear transmission line containing a garnet-structured ferrite material.

2. An RF signal generator according to claim 1 wherein a magnetic field is applied to the transmission line.

3. An RF signal generator according to claim 2 wherein the magnetic field has a component axially orientated to the transmission line.

4. An RF signal generator according to claim 1 wherein the transmission line has conductors made from copper, silver or gold.

5. An RF signal generator according to claim 1 wherein the impulse generator produces a pumping impulse.

6. An RF signal generator according to claim 1 further comprising a frequency output tuner to adjust the frequency at which the video pulses are modulated.

7. An antenna having a Radio Frequency (RF) signal generator according to claim 1.

8. A method of generating Radio Frequency (RF) signals including the steps of:
   generating video impulses; and
   modifying the video pulses' energy by impulse excited gyromagnetic action of a non-linear transmission line including a garnet-structured ferrite material to transfer energy from frequencies below the RF range to frequencies in the RF range, thereby producing a resultant corresponding waveform with an RF component.

* * * * *